H. MOCK.
HEAT INSULATOR.
APPLICATION FILED MAY 11, 1905.
903,878. Patented Nov. 17, 1908.
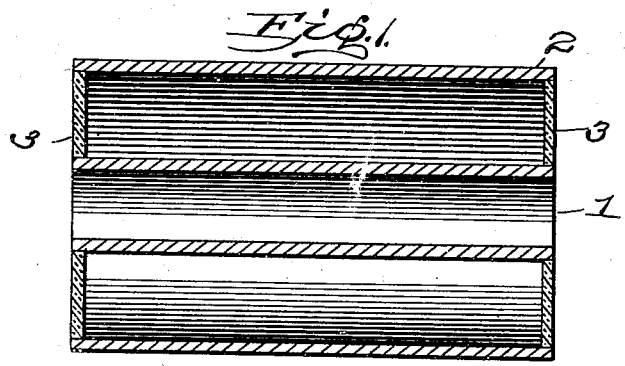
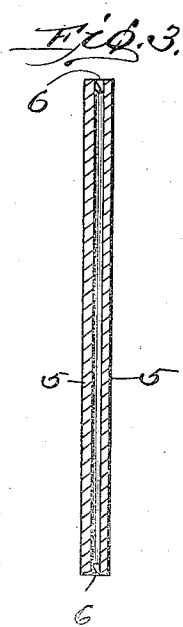
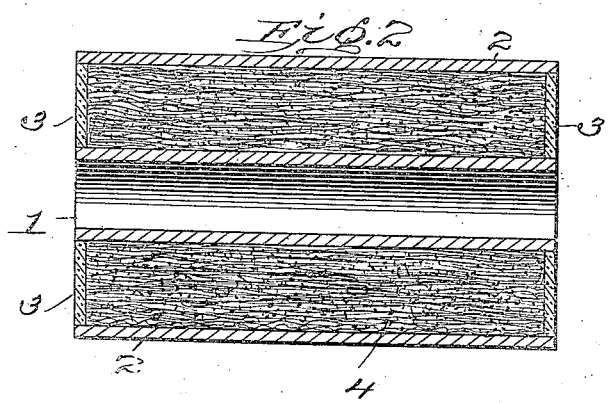
Witnesses
J. M. Fowler Jr
Edgar M. Kitchin
Inventor
Hugo Mock
By Mason, Fenwick & Lawrence
his Attorney

UNITED STATES PATENT OFFICE.

HUGO MOCK, OF NEW YORK, N. Y.

HEAT-INSULATOR.

No. 903,878.　　　Specification of Letters Patent.　　　Patented Nov. 17, 1908.

Application filed May 11, 1905. Serial No. 260,061.

*To all whom it may concern:*

Be it known that I, HUGO MOCK, a citizen of the United States, residing at New York, in the county of New York and State of New York, have invented certain new and useful Improvements in Heat-Insulators; and I do hereby declare the following to be a full, clear, and exact description of the invention, such as will enable others skilled in the art to which it appertains to make and use the same.

This invention relates to improvements in heat insulators, and contemplates the provisions of means for deflecting heat rays combined with a heat non-conducting medium.

The invention contemplates certain other novel features hereinafter fully described and claimed.

In the accompanying drawings:—Figure 1 represents a longitudinal vertical section through the heating insulator combining the features of the present invention, Fig. 2 represents a modified embodiment of the same, Fig. 3 represents a further embodiment thereof.

It will generally be found to be the case that any medium which is not a conductor of heat, will not serve as a baffle against radiation, and any medium which will serve to deflect radiating heat, will be found to be a good heat conductor. Therefore, to obtain the best results in the insulating of heat, I propose to employ a combination of the media mentioned, so that while one deflects radiating heat, the other will serve to prevent heat conduction.

In carrying out this invention, as an example, I propose to employ as a non-conducting medium, a vacuum, and as a non-radiating medium, any suitable metallic plate or surface. However, I find that if the vacuum space be closed in all sides by a conducting medium, so that the conducting medium may prevent communication of heat through the vacuum by radiation, the heat will be conducted about the conducting medium and the object of insulation thus defeated. Therefore in my preferred embodiment, I propose to employ, as seen in Fig. 1 of the drawing, a plate 1, seen in the form of a relatively small cylinder, made of metal or other suitable heat conducting material, and a plate 2, seen in the drawing in the form of a large concentric cylinder, made of metal or other suitable heat conducting material, spaced at all points from the plate 1, the ends of the plates 1 and 2 being held in their spaced apart condition by an annulus 3 of glass or other suitable non-conducting material, at each end. The air is exhausted from the spaces between the plates 1 and 2, so that for the greater part of the length of said plates, the medium therebetween is what I believe to be the best heat non-conductor, and the remaining distance is covered by heat non-conducting material of perhaps slightly less efficiency, but of as great resistance to the conduction of heat as possible, while susceptible of resisting atmospheric pressure. Thus a structure, such as seen in Fig. 1, might have the inner cylinder 1 filled with some substance, which might be injured by heat, and the radiating heat about the cylinder 2 will be deflected by said cylinder and conducted throughout the length thereof, but will not approach the cylinder 1, because of the insulating media between the two cylinders. Of course, although I have disclosed the cylinder 1 open at its ends, the showing being merely for purposes of illustration, said cylinder would necessarily be closed with heat insulating stoppers made for the manner of the device seen in Fig. 1, if a substance were placed in the cylinder 1, for the purpose of preventing the approach of heat.

In Fig. 2, I have illustrated the same device as is shown in Fig. 1, but have carried out the conception further by filling the vacuum space between the cylinders 1 and 2, with a fibrous non-conducting heat substance 4, which is, for example, mineral wool arranged with its fibers parallel to the longitudinal axis of the cylinders 1 and 2. The parallelism of the said fibers with each other and with the said cylinders, tends to prevent radiation of heat through the space occupied by said mineral wool, and to increase the non-conducting capacity of such wool. The mineral wool 4 is packed as closely as possible, but the necessary exhaust therein, instead of being filled with air, as is usual, is deprived of the air, and therefore the mineral wool is packed in the vacuum.

In Fig. 3, I have illustrated a structure involving exactly the structure of the device seen in Fig. 1, modified slightly therefrom in contour. In Fig. 3, are seen, in section, two parallel plates 5—5 of some good heat conducting substance spaced apart by a non-conducting enamel 6, the space between said plates 5—5, being exhausted of its air.

Of course, it is understood that any desired application of the present improved heat insulator, may be made, and the plates inclosing the vacuum space, and the medium employed for connecting said plates, may be of any desired size, shape and arrangement for adapting the device to any given use.

What I claim is:—

1. A heat insulator comprising metallic plates spaced apart, said plates being connected by a non heat conducting enamel to inclose an air-tight space, said space being afterwards exhausted to form a vacuum therein.

2. A heat insulator comprising metallic plates spaced apart, said plates being joined by a heat non-conducting glass-like enamel so as to inclose an air-tight space, said space being afterwards exhausted so as to form a vacuum therein.

3. A heat insulator comprising flat parallel metallic plates spaced apart and joined by a heat non-conducting glass-like enamel so as to inclose an air-tight space, said space being afterwards exhausted so as to form a vacuum.

4. A heat insulator comprising metallic plates spaced apart and a glass-like enamel having the same co-efficient of expansion as said plates joining said plates, a vacuum being formed in the space formed by said plates and said enamel.

5. A heat insulator comprising metallic plates joined by a non-conducting glass-like enamel, the space inclosed by said plates and enamel being filled with a fibrous non-conductor of heat, said space being afterwards exhausted so as to form a vacuum with the exception of said fibrous non-conductor.

6. A heat insulator comprising metallic plates joined by a glass-like enamel so as to inclose an air-tight space, said space being filled with a fibrous non-conductor of heat, whose fibers are substantially parallel with said plates, said space being afterwards exhausted so as to form a vacuum with the exception of said fibrous filling.

7. A heat insulator comprising metallic plates spaced apart, said plates being joined by a glass-like enamel so as to inclose an air-tight space, said space being filled with mineral wool and afterwards exhausted so as to form a vacuum therein with the exception of said filling.

8. A heat insulator comprising concentric metallic cylinders spaced apart, said cylinders being joined by a glass-like enamel so as to inclose an air-tight space, a fibrous heat non-conducting filling inserted in said space and a vacuum being formed in said space with the exception of said filling.

9. In a heat insulator, concentric cylinders joined by a heat non-conducting enamel so as to inclose an air-tight space, said space being filled with mineral wool and a vacuum being formed in said space with the exception of said filling.

10. In a heat insulator, concentric metallic cylinders spaced apart, said cylinders being connected by glass rings so as to inclose an air-tight space, said space being afterwards exhausted so as to form a vacuum.

In testimony whereof I affix my signature in presence of two witnesses..

HUGO MOCK.

Witnesses:
IRA JAY DUTTON,
NELLIE LOVE.